(12) United States Patent
Madmony et al.

(10) Patent No.: US 9,971,418 B2
(45) Date of Patent: May 15, 2018

(54) TRACKER FOR CURSOR NAVIGATION

(71) Applicant: Intel Corporation, Santa Clara, CA (US)

(72) Inventors: Maoz Madmony, Beit Kama (IL); Kfir Viente, Jerusalem (IL); Ovadya Menadeva, Modiin (IL); Itamar Glazer, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 14/757,883

(22) Filed: Dec. 24, 2015

(65) Prior Publication Data

US 2017/0185166 A1  Jun. 29, 2017

(51) Int. Cl.
| | |
|---|---|
| *G06F 3/03* | (2006.01) |
| *G06T 7/00* | (2017.01) |
| *G06T 7/20* | (2017.01) |
| *G06F 3/0481* | (2013.01) |

(52) U.S. Cl.
CPC ........ *G06F 3/0304* (2013.01); *G06F 3/04812* (2013.01); *G06T 7/0042* (2013.01); *G06T 7/0071* (2013.01); *G06T 7/2033* (2013.01); *G06T 2207/20* (2013.01)

(58) Field of Classification Search
None
See application file for complete search history.

(56) References Cited

U.S. PATENT DOCUMENTS

| | | | |
|---|---|---|---|
| 8,938,124 B2 | 1/2015 | Eilat et al. | |
| 9,501,152 B2 * | 11/2016 | Bedikian | G06F 3/011 |
| 2011/0138324 A1 * | 6/2011 | Sweeney | G06F 3/0481 |
| | | | 715/800 |
| 2011/0206236 A1 * | 8/2011 | Center, Jr. | G06T 7/269 |
| | | | 382/103 |
| 2012/0200498 A1 * | 8/2012 | Quennesson | G06F 3/012 |
| | | | 345/157 |
| 2012/0293635 A1 | 11/2012 | Sharma et al. | |
| 2015/0022677 A1 | 1/2015 | Guo et al. | |
| 2015/0055821 A1 | 2/2015 | Fotland | |

OTHER PUBLICATIONS

PCT International Search Report, PCT Application No. PCT/US2016/057638, dated Feb. 2, 2017, 3 pages.
Levy, Ofir, U.S. Appl. No. 14/953,622, filed Nov. 30, 2015, US Application, Drawings, and Acknowledgment Receipt dated Nov. 30, 2015 attached (33 pages), not yet published.

* cited by examiner

*Primary Examiner* — Kenneth B Lee, Jr.
(74) *Attorney, Agent, or Firm* — Grossman, Tucker, Perreault & Pfleger, PLLC

(57) ABSTRACT

A system for a tracker for cursor navigation is described herein. The system includes a display, camera, memory, and processor. The memory that is to store instructions and is communicatively coupled to the camera and the display. The processor is communicatively coupled to the camera, the display, and the memory. When the processor is to execute the instructions, the processor is to extract an object mask of an object and execute an optical flow on good feature points from the object mask. The processor is also to estimate a movement of the object and render a cursor on the display based on the movement of the object.

25 Claims, 6 Drawing Sheets

100

TRACKER FOR CURSOR NAVIGATION

BACKGROUND ART

Electronic devices can enable computer vision by duplicating the abilities of human vision by electronically perceiving and understanding an image. In some cases, the electronic device will follow or track the movements of a set of interest points or objects in an image sequence. In particular, the electronic device can track the movements of a human hand to implement a user-interface with the electronic device. The ability to provide a hand-tracking mechanism is fundamental in implementing a natural user interface based on hand gestures.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, a hand-tracking mechanism is used to implement a natural user interface with an electronic device based on hand gestures. In some cases, mean shift blob tracking is used as a hand tracking mechanism. The mean-shift algorithm is a nonparametric statistical method for seeking the nearest mode of a point sample distribution. Ellipse tracking can be used to track a physical extension of the object with an ellipse, and the ellipse center is used as the new location of the object. Additionally, fingertip tracking can be used as a hand tracking mechanism. Fingertip tracking takes a frame and finds a salient point on a contour that best describes a finger, or alternatively a local maxima in the depth image is used as a fingertip point.

Each of the mean shift, ellipse tracking, and fingertip tracking each track a specific point, usually the center of the hand, fingertip or the ellipse center. The tracking of a single point can lead to jitteriness, quantized tracking, delay, and overshooting. Jitteriness can be mitigated by applying a stabilizing and smoothing algorithm. However, the stabilizing and smoothing algorithm can result in quantized tracking, where when the hand is moving slowly, the stabilizing method results in discrete jumps in movement. Delay occurs when applying a smoothing algorithm on the final result. Delay can be mitigated by using a prediction algorithm. However, a prediction algorithm can lead to overshooting, where the hand has stopped but the tracking continues.

Embodiments described herein enable a tracker for cursor navigation. In embodiments, a main motion vector of an object is analyzed. In order to evaluate the main movement of the object, an optical flow algorithm is used to track pixels on an object mask. A specific point is not tracked, rather a main motion vector of the object is calculated and used to apply movement to a rendered cursor. The result is a smooth and responsive movement of the rendered cursor that tracks the movement of the object. In embodiments, the system is configurable, enabling full control in the levels of stabilization and responsiveness by a change of thresholds. As used herein, the optical flow is a pattern of apparent motion of objects, surfaces, and edges in a visual scene caused by the relative motion between an observer, such as a camera or other viewpoint, and the scene. Additionally, in embodiments an optical flow is defined as the change of structured light in the image due to a relative motion between the camera and the scene.

Figure 1:
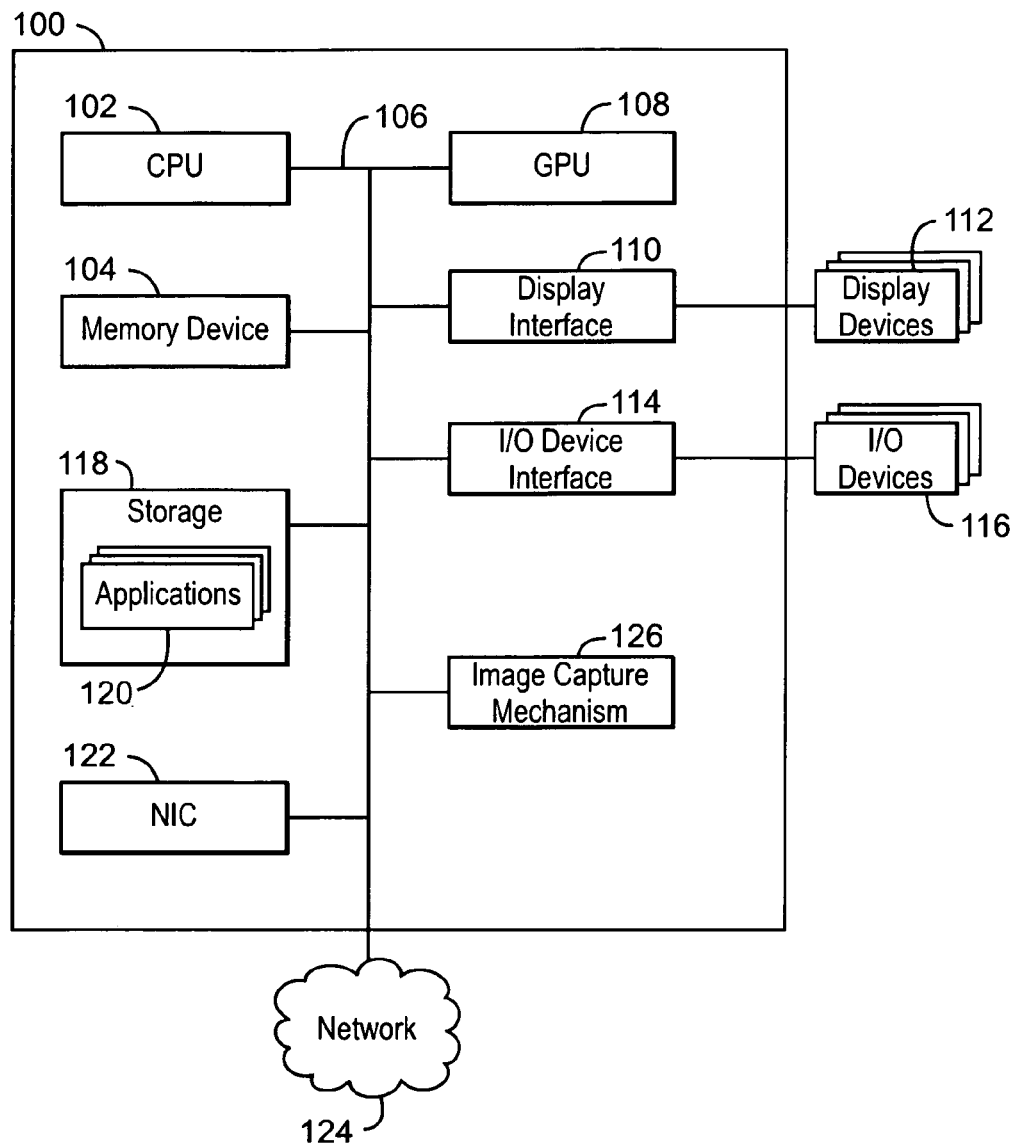
FIG. 1 is a block diagram of an electronic device 100 that can be used to enable a tracker for cursor navigation.

FIG. 1 is a block diagram of an electronic device 100 that can be used to enable a tracker for cursor navigation. The electronic device 100 can be, for example, a laptop computer, desktop computer, tablet computer, mobile device, or server, among others. In particular, the electronic device 100 can be a mobile device such as a cellular phone, a smartphone, a personal digital assistant (PDA), phablet, or a tablet. Additionally, the electronic device 100 can be any device that is to track various objects, such as a gaming console or a component of a gaming console. The electronic device 100 can include a central processing unit (CPU) 102 that is configured to execute stored instructions, as well as a memory device 104 that stores instructions that are executable by the CPU 102. The CPU can be coupled to the memory device 104 by a bus 106. Additionally, the CPU 102 can be a single core processor, a multi-core processor, a computing cluster, or any number of other configurations. Furthermore, the electronic device 100 can include more than one CPU 102. The memory device 104 can include random access memory (RAM), read only memory (ROM), flash memory, or any other suitable memory systems. For example, the memory device 104 can include dynamic random access memory (DRAM).

The electronic device 100 can also include a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The computing device also includes a storage device 118. The storage device 118 is a physical memory such as a hard drive, a solid state drive, an optical drive, a thumbdrive, an array of drives, or any combinations thereof. The storage device 118 can also include remote storage drives such as used for cloud computing applications. The storage device 118 includes any number of applications 120 that are configured to run on the electronic device 100. In embodiments, the applications may be a plurality of applications that enables video game play or gesture based interaction with a computing device.

The electronic device 100 can also include a network interface controller (NIC) 122. The NIC 122 can be configured to connect the electronic device 100 through the bus 106 to a network 124. The network 124 can be a wide area network (WAN), local area network (LAN), or the Internet, among others. The electronic device 100 also includes an image capture mechanism 126. In some examples, the image capture mechanism 110 is a camera, stereoscopic camera, scanner, infrared camera/sensor, heat dissipation camera, radar, or the like. The image capture mechanism 126 may capture depth, infrared, or color images of a scene. Additionally, the image capture mechanism may be a three-dimensional camera. The image capture mechanism may be used to capture a scene, where the scene includes a field of view of the camera or a portion of the field of view of the camera. The scene may be captured as a series of frames. A robust algorithm may be applied to a sequence of frames from the image capture mechanism to achieving a smooth motion of a cursor that tracks the movement of the object. The algorithm may provide full responsiveness of the cursor without any interference of a post process smoothing algorithm.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

In embodiments, the image capture mechanism is used to obtain depth information of a scene. The depth information enables an accurate mask of an object in the scene to be obtained with a small but reliable amount of feature points, which increases accuracy and performance. As used herein, the object mask or block is an area of interest in a scene that is to be tracked. In examples, the object mask may correspond to a hand in the scene. The hand may be tracked and rendered on a display as a cursor that is to enable gesture based interaction with an electronic device. Additionally, the object mask or block may correspond to a full body in a scene, or any other object that is to be tracked in the scene.

Figure 2:
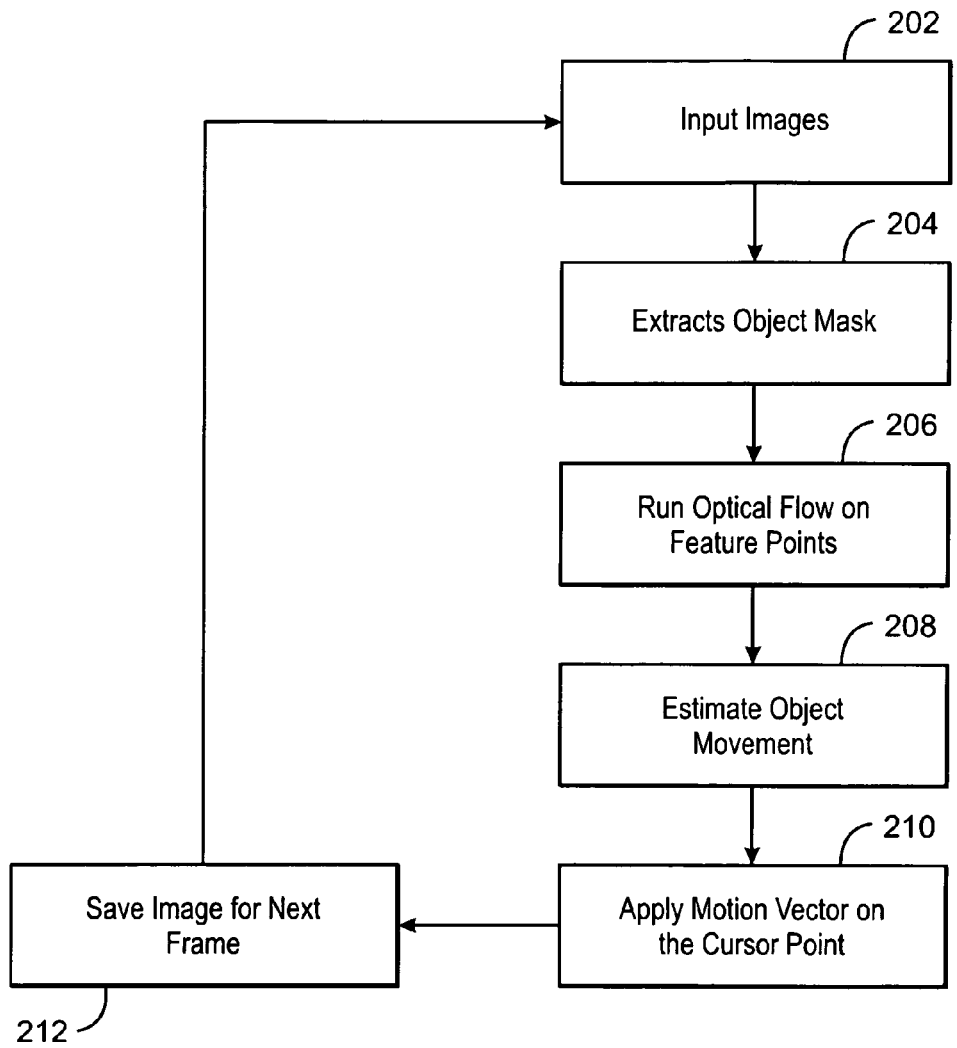
FIG. 2 is a process flow diagram of a method for object tracking. At block 202, input images are obtained.

FIG. 2 is a process flow diagram of a method 200 for object tracking. At block 202, input images are obtained. The object tracking may be performed with a sequence of images from a three dimensional (3D) camera. In embodiments, the sequence of images may be a sequence of a depth map, infrared, or color images. A depth image contains information relating to the distance of the surfaces of scene objects from a viewpoint. The infrared image is an image that displays the measured infrared (IR) light radiating from objects in its field of view. In some embodiments a 2D image is acquired by regular red, green, and blue (RGB) imaging with a translation from RGB to a depth map.

At block 204, an object mask or blob is extracted from the frames. In embodiments, the object mask is extracted from a frame that includes a depth image. The object mask is a binary image, where all the pixels of the object have a value equal to a first value, and all other pixels in the frame equal to a second value. For example, all the pixels of the object may have a value equal to 255 while all other pixels in the frame have a value of 0. For every new frame the blob or mask of the hand is extracted. A foreground extractor algorithm is applied to each frame and combined with blob tracker. In this manner, frame to frame object tracking can be performed and the mask or blob of the tracked object is provided. As used herein, the foreground extractor is a module that separates the object (foreground) from the background (in this case—everything that is not the tracked object). The blob tracker is a module that tracks the object from frame to frame, such that every foreground object is attached to its corresponding object from the previous frame.

At block 206, an optical flow determination is performed on the feature points. Based on the motion of each individual feature point, the motion of the object is described. In embodiments, the optical flow determines a pattern of apparent motion of objects, surfaces, and edges in the scene. The optical flow is used to determine the motion vectors of the feature points between consecutive frames. The movement of objects in a sequence of frames may be analyzed to obtain vectors that represent the estimated motion of the object between frames. In embodiments, the frame is divided into macroblocks, and the motion vectors represent the change in position of a macroblock between frames. The optical flow may be performed using the Lucas-Kanade optical flow or Gunnar Farneback's algorithm. In embodiments, the optical flow can be implemented by any algorithm that enables frame to frame pixel tracking.

The object mask may be tracked using a corner detection technique. The feature points are used as a starting point for the optical flow. The optical flow algorithm finds, for each feature point, the corresponding point in the next frame. These feature points should be good, or informative, to correctly track the object. In particular, the feature points must be on the object mask, and not on the background. In embodiments, feature points describing the object mask may be obtained via corner detection. A feature point is a point in an image which contains a large amount of information regarding the structure of the image. Typically, image components such as corners and crosses of the object indicate a good feature point, where a good feature point is one that can describe corners, crosses, or edges of an object. Additionally, good feature points may be locally unique, spatial localized, and scale invariant. Corners of the object may be good feature points because they have large intensity differences in two different directions. Additionally, corners are likely to be locally unique and spatially localized.

Corner detection algorithms may provide a numerical score for each pixel of each frame. The score is a measure of the likelihood that the pixel is as a feature point that is detectable in the sequence of frames. An example corner detection algorithm is the Harris Corner algorithm. A threshold may be applied to the score found by the Harris Corner algorithm to distinguish good feature points from the set of feature points found by the Harris Corner algorithm. The good feature points that have been determined to define an object of interest can be used to provide accurate motion vectors in a sequence of frames. In this manner, the motion of each individual object in the scene is computed.

A block 208, an estimation of the object movement is performed. The estimation may be performed using the smallest half of the motion vectors that were extracted from the optical flow. The smallest half of the motion vectors may be averaged into a mean motion vector. At block 210, the mean motion vector can be applied to the rendered cursor point. This results in a transition of the cursor to its new location. At block 212, the current images are saved for use with calculations at the next frame. Process flow returns to block 202 where the next frame is used to track the cursor position. In this manner, the cursor may be iteratively rendered on a display based on the estimated motion vectors.

As discussed above, previous solutions are based on tracking a specific point of the object, such as the center of mass, a fingertip, and the like. Tracking a specific point leads to an inherent jitteriness of the tracked object, caused due to the fact that this specific point is determined to be in a slightly different position within a few consecutive frames, even in case when the object is static. The amplitude of this jitteriness usually depends on several elements like the image resolution, noise model, etc. Further, this jitteriness requires the application of smoothing and stabilizing algorithms with variant strength, corresponding to the noise level, after the object has been tracked. The subsequent smoothing procedure adds additional drawbacks such as delay in tracking and overshooting the tracking. The subsequent stabilization makes the object tracking appear broken, especially when the object is moving slow. This results in a bad user experience, where it is almost impossible to accurately reach a specific point on screen, while totally freezing in some cases. The present techniques enable a robust algorithm for achieving a totally smooth motion combined with full responsiveness, without any interference of a post processing smoothing and/or stabilization algorithm.

Figure 3:
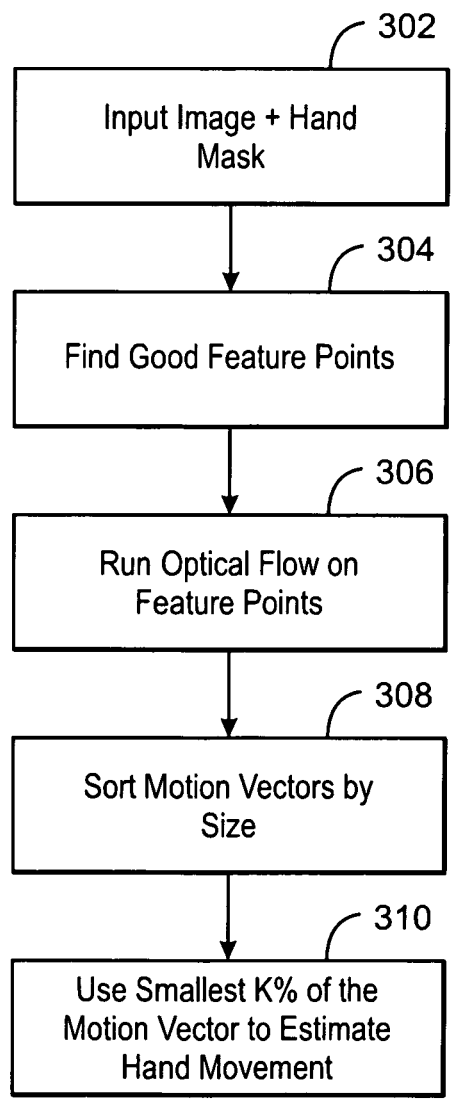
FIG. 3 is a process flow diagram of a method 300 to estimate the main motion vector of an object.

FIG. 3 is a process flow diagram of a method 300 to estimate the main motion vector of an object. The object may be determined as described above. At block 302, an object mask or blob is obtained. As discussed above, the object mask is obtained from an input image, and the input image may be a depth or infrared image. At block 304, good feature points of the object are found. The good feature points may be obtained via corner detection. Corner detection, such as the Harris corner algorithm (Harris corner) may be applied to a previous image. If the data is very noisy, the good feature points may be limit to points only on the object contour. As used herein, the contour of the object is the portion of the object that defines a silhouette of the object.

At block 306, an optical flow is ran on the good feature points. In embodiments, a Lucas-Kanade optical flow algorithm is used to find corresponding points on the current frame image. The Lucas-Kanade algorithm assumes that the flow is essentially constant in a local neighborhood of the pixel under consideration, and solves a set of basic optical flow equations for all the pixels in that neighborhood using the least squares criterion. At block 308, the motion vectors, determined by the optical flow, are sorted by size. In embodiments, the motion vectors are sorted in an ascending fashion.

At block 310, a predefined threshold is applied to the sorted motion vectors. The threshold (TH) may be expressed as a percentage in order to select a lowest percent of motion vectors. For example, if TH=0.5 with a total of 50 motion vectors assorted in an ascending manner, the first 25 motion vectors are selected from the sorted array of motion vectors. At block 312, a mean motion vector is calculated using the selected motion vectors. This mean motion vector represents the estimated object movement.

Figure 4:
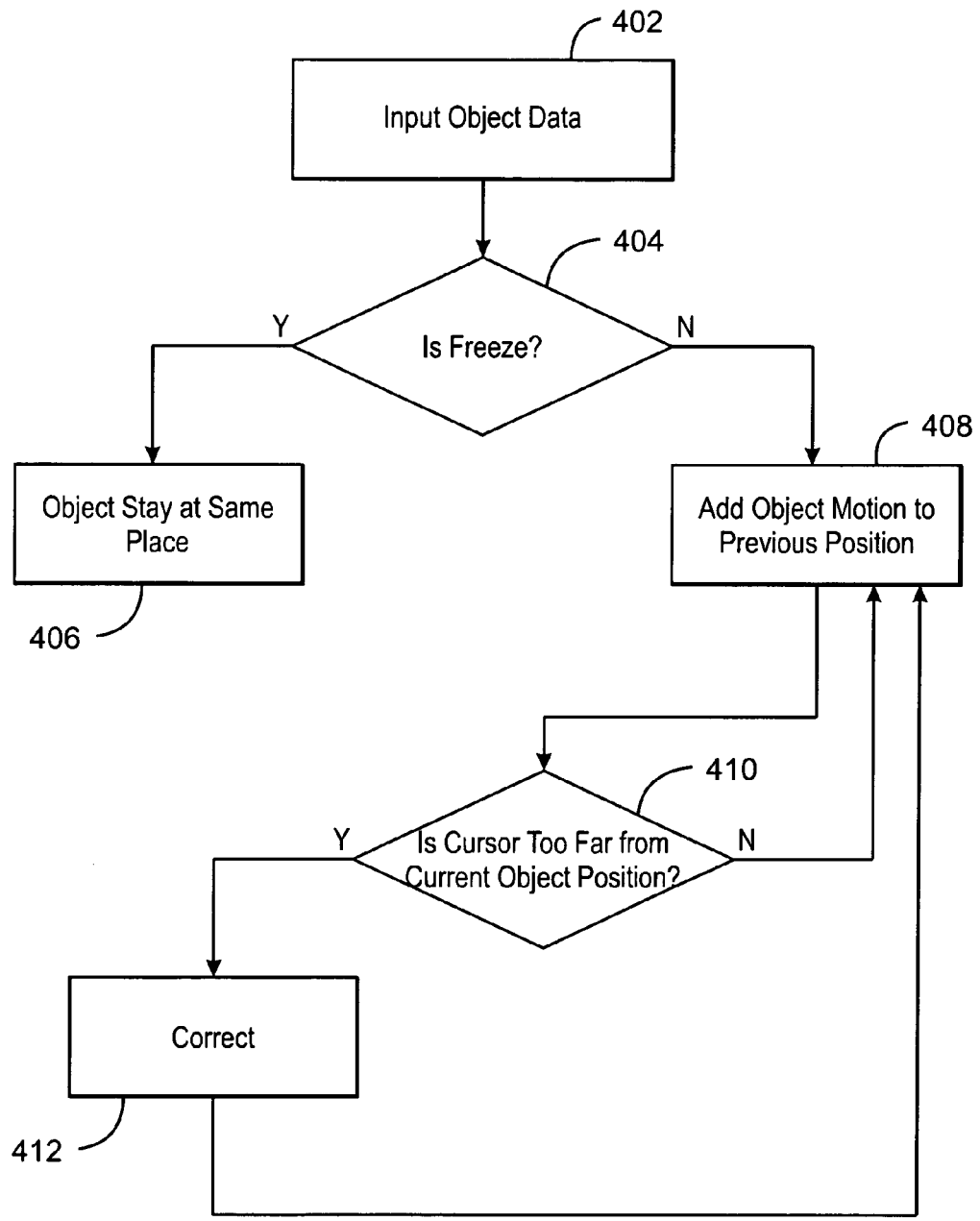
FIG. 4 is a process flow diagram of a method 400 for estimating an object location.

FIG. 4 is a process flow diagram of a method 400 for estimating an object location. At block 402, the object data is input. In embodiments, the object data is a calculated mean motion vector. Additionally, the object data may include the object mask, the object center of mass as a 3D point, an object ellipse, as well as the estimated motion vector. If a previous position of the object is not available, the position of the object is the center of the ellipse/center of mass of the hand.

At block 404, it is determined if the object is stationary or frozen. If the object is stationary, process flow continues to block 406. If the object is not stationary, process flow continues to block 408. In order to be in a frozen or stationary state, two conditions should be fulfilled. First, the object mean motion vector length should be lower than a first threshold (TH1). Second, the accumulated object motion vector should be lower than a second threshold (TH2), such that TH2>TH1. In embodiments, the accumulated object motion vector is the sum of all motion vectors calculated since the last time the object was not in freeze mode. Using only the first threshold (TH1) to determine if the object is stationary can lead to a situation where the object moves very slowly, resulting in the motion vector always being lower than this first threshold (TH1). This situation results in movement of the object but a frozen or stationary cursor position. To overcome this frozen cursor, motion vectors are accumulated from frame to frame to ensure that when the object moves slowly, at some point the accumulated motion vector will exceed the second threshold (TH2). In embodiments, the motion vectors are accumulated in response to the object mean motion vector length should be lower than a first threshold (TH1).

At block 406, no movement is applied to the object and the object stays in the same location. When the object has been determined to be frozen, the object and corresponding cursor stays at the same position. By adjusting the TH1 and TH2 values, the strength of any stabilization can be set as the cursor point is responsive. At block 408, the calculated motion vector is applied to a previous position of the object. Thus, when the hand is not frozen, the object motion vector to the previous object position. The cursor is rendered according to the new object position.

At block 410, it is determined if the resulting rendered cursor position is too far from the calculated object position. In order to avoid drifting of the rendered cursor, when the cursor point gets too far from the object location, check is performed to determine if the new cursor position is too far from the calculated object position. A predefined threshold (TH3) may be applied to the distance to determine if the cursor drift has passed an acceptable level. If the distance between the rendered cursor point and the calculated object location is lower than TH3, process flow continues to block 412. If the distance between the rendered cursor point and the calculated object location is higher than or equal to TH3, process flow returns to block 408. In embodiments, object position is determined by the estimated palm ellipse, or the center of mass of the object mask. In embodiments, to avoid drifting the present techniques converge toward the center of the hand as described above. In case the converge fails, the motion vector is used to counteract drift through the use of weights.

If the resulting rendered cursor position is not too far from the calculated object position, process flow returns to block 408 and the position of the object is confirmed, the hand motion is added to the previous location of the object, and the new position will be used for future calculations. If the resulting rendered cursor position is too far from the calculated object position, at block 412 to cursor position is corrected. In such a scenario, the calculated object position has been determined to be too far from the hand position and above a third threshold. The object position may be corrected by applying a weighted mean between the new position and the object center. The weighted mean is used in order to avoid a discontinuous behavior of the cursor point. The weighted mean may be calculated through various weights applied in order to meet design goals. In this case, the algorithm will converge toward the hand position. Process flow then returns to block 408.

Figure 5:
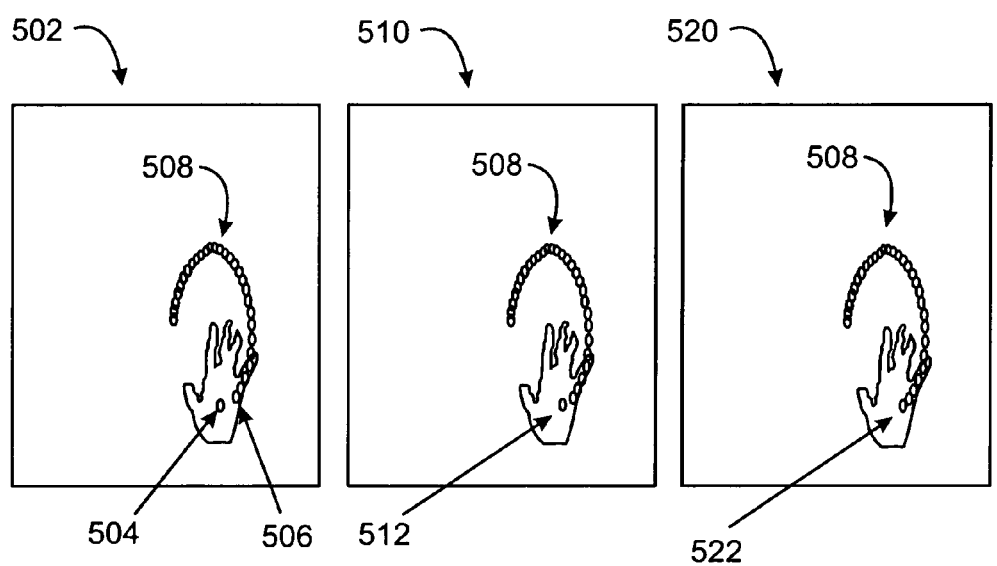
FIG. 5 is an illustration of an application of a weighted mean.

FIG. 5 is an illustration of an application of the weighted mean as discussed above. A frame 502 illustrates a hand center at 504 and the cursor last position at 506. As illustrated, the cursor has progressed through a series of movements 508. The cursor position can be tracked as described above. In some cases, the distance between the hand center and the cursor position may be greater a predefined threshold TH3. In order to prevent drift, a weighted average may be applied to the last cursor point and the hand center point.

Accordingly, the hand center point can miss a position from time to time. This results in the new cursor point being too far from the hand center point and should be avoided. In embodiments, if the position of the cursor is greater than a predefined threshold TH3, the position of the cursor is not adjusted when the drift is first detected. Rather, the position is corrected by applying weights after K amount of frames have been processed. In embodiments, K is constant and defined at compilation time. The value of K depends on the expected noise of the hand ellipse/center of mass. Typically, K will be defined as 2-3 frames.

A frame 510 illustrates a weight of 0.5 applied to each of the last cursor point and the hand center point. In the frame 510, the new point 512 is calculated as follows:

newPoint=0.5*prevPoint+0.5*centerPoint

However, there remains a large distance or jump between the series of movements 508 and the new point 512. Thus, the distance or jump may still be greater than the predefined threshold TH3. A frame 520 illustrates a weight of 0.75 applied to the last cursor point and a weight of 0.25 applied to the hand center point. In the frame 520, the new point 522 is calculated as follows:

newPoint=0.75*prevPoint+0.25*centerPoint.

This weight results in a smoothed motion of the hand. If the cursor moves in a direction that does not correlate with the motion vector obtained the optical flow, the fix of the drift may not be applied to correct the possible drift unless the cursor has move an unreasonably large amount that causes jitteriness. The unreasonably large amount between the hand center point and the cursor point is higher than the predefined threshold TH3. Put another way, an attempt to fix/converge the cursor point toward the hand center can cause the movement of the cursor to appear broken or not smoothed. In such a case this fix will not be applied to the cursor point unless the cursor is too far from the center point such that the distance between the cursor and the center point is higher than, for example, 2*TH3.

For ease of description, tracking of the object has been described as resulting in an output of a cursor position in a two-dimensional space. However, the output point of the cursor is a three-dimensional point, which includes the distance of the object from an image capture mechanism, such as a camera. A sample of the distance of the object from a single point or an area around the ellipse center/center of mass of the object could be used to determine the distance. However, the distance could then be influence by a pose of the object as well as noise in the depth. A statistical approach may be used that sorts the depth values of the object, and finds the depth value of a percentage of pixels. This depth value is the distance from the camera.

The hand mask, depth image, last cursor point, and a first estimation of the hand distance can be used to find the depth value. The first estimation of the hand distance can be an average depth of the hand (d). A window is applied to the cursor point, where the size of the window is approximately the size of an ellipse major axes. In this window, all the depth values masked with the hand mask are obtained. Next, a histogram of all the depth values in the window is generated. The histogram range is between [d−10,d+10] and has 30 bins, where each bin is approximately 0.66 cm.

Bin sizes are accumulated until a percentage of the pixels are included. For example, the percentage may be approximately 97% of the pixels, such that $$(h(1)+h(2)+ \ldots +h(k)>=0.97*\text{total pixels})$$

Where h(i) is the amount of pixels with value represented by the ith bin. Each cell in the histogram represent a distance from the camera such that $$H(1)=d-10, \text{ and } h(n)=d+10$$

The final distance of the hand is the distance represented by Kth cell as calculated by the following equation:

$$\text{Dist.}=d-10+K*0.66$$

This ensures that noisy pixels do not factor into the depth calculation. The noisy pixels may be the 3% of the farthest pixel. The distance calculation also provides the distance of the back of the object, such as a hand. It is possible to change the percentage in order to get a different distance. For example, if the distance of the center of the hand is desired, the first 50% of the pixels may be used.

Figure 6:
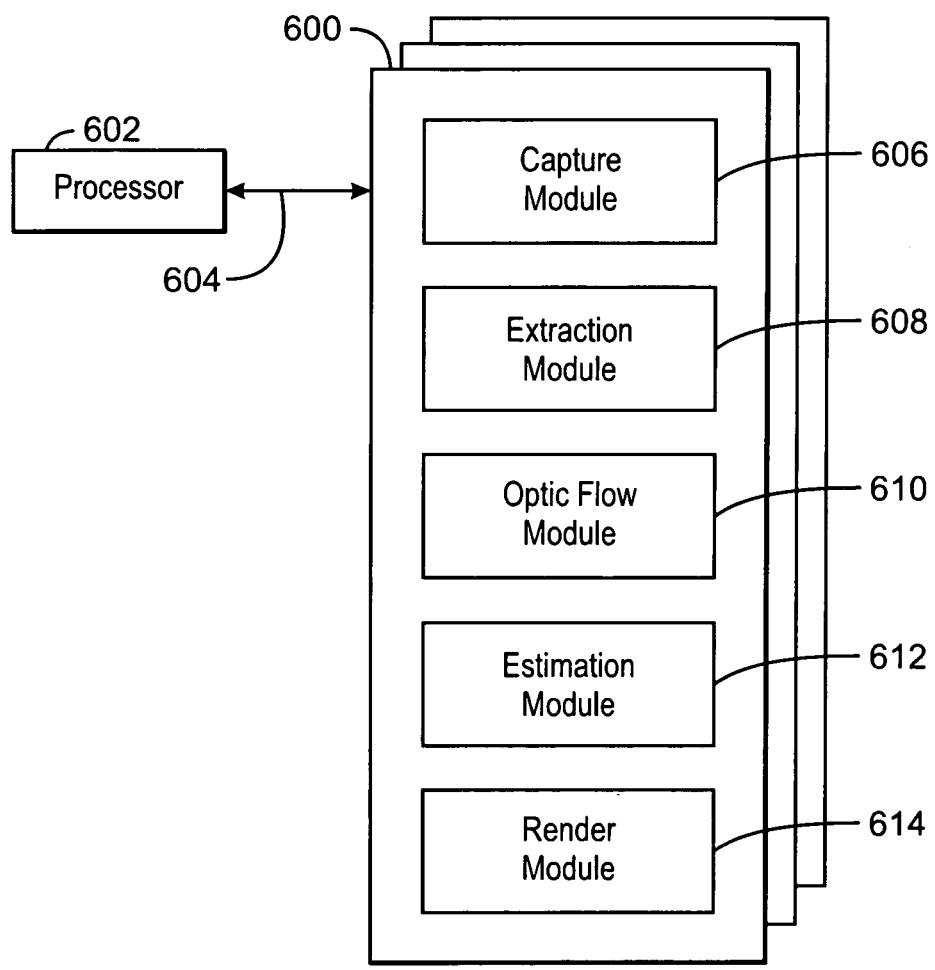
FIG. 6 is a block diagram showing a medium 500 that contains logic for enabling a tracker for cursor navigation.

FIG. 6 is a block diagram showing a medium 600 that contains logic for enabling a tracker for cursor navigation. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-614 configured to perform the techniques described herein. For example, a capture module 606 may be configured capture or provide an input image. An extraction module 608 may be configured to extract an object mask. An optic flow module 610 may be configured to apply an optical flow to good feature points. An estimation module 612 may be configured to estimate a motion vector. A render module 614 may be configured to render the cursor by applying the estimated motion vectors. In some embodiments, the modules 606-514 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

EXAMPLES

Example 1 is a system for a tracker for cursor navigation. The system includes a display; a camera; a memory that is to store instructions and that is communicatively coupled to the camera and the display; and a processor communicatively coupled to the camera, the display, and the memory, wherein when the processor is to execute the instructions, the processor is to: extract an object mask of an object; execute an optical flow on good feature points from the object mask; estimate a movement of the object; and render a cursor on the display based on the movement of the object.

Example 2 includes the system of example 1, including or excluding optional features. In this example, the object mask is extracted from a sequence of frames obtained from the camera.

Example 3 includes the system of any one of examples 1 to 2, including or excluding optional features. In this example, the camera is to capture depth information of the object.

Example 4 includes the system of any one of examples 1 to 3, including or excluding optional features. In this example, the good feature points are determined using corner tracking.

Example 5 includes the system of any one of examples 1 to 4, including or excluding optional features. In this example, the movement of the object is estimated by obtaining motion vectors for the good feature points across a sequence of frames.

Example 6 includes the system of any one of examples 1 to 5, including or excluding optional features. In this example, the movement of the object is estimated by obtaining motion vectors for the good feature points across a sequence of frames, and the motion vectors with the lowest length are selected and a mean motion vector is determine using the motion vectors with the lowest length.

Example 7 includes the system of any one of examples 1 to 6, including or excluding optional features. In this example, the cursor is to track the movement of the object.

Example 8 includes the system of any one of examples 1 to 7, including or excluding optional features. In this example, the optical flow is performed via a Lucas-Kanade algorithm.

Example 9 includes the system of any one of examples 1 to 8, including or excluding optional features. In this example, the system is a gaming device.

Example 10 includes the system of any one of examples 1 to 9, including or excluding optional features. In this example, a weighted mean is applied to the estimated motion vectors.

Example 11 is a method. The method includes extracting an object mask of an object; executing an optical flow on good feature points from the object mask; estimating a movement of the object based on the optical flow; and rendering a cursor based on the movement of the object.

Example 12 includes the method of example 11, including or excluding optional features. In this example, the method includes obtaining motion vectors of good feature points in a sequence of frames; selecting the motion vectors with a lowest length; and averaging the motion vectors with the lowest length to obtain a mean motion vector.

Example 13 includes the method of any one of examples 11 to 12, including or excluding optional features. In this example, the method includes obtaining an average motion vector of an object movement; in response to the motion vector being above a threshold, apply the average motion vector to a rendered cursor position; and in response to the motion vector being far from a current cursor position, applying a weighted mean to the average motion vector.

Example 14 includes the method of any one of examples 11 to 13, including or excluding optional features. In this example, the movement of the object is estimated using a motion vector. Optionally, the motion vector is calculated via frame to frame pixel tracking.

Example 15 includes the method of any one of examples 11 to 14, including or excluding optional features. In this example, the movement of the object is estimated using a smallest half of a plurality of motion vectors extracted from the optical flow.

Example 16 includes the method of any one of examples 11 to 15, including or excluding optional features. In this example, the object mask is extracted via a foreground extractor.

Example 17 includes the method of any one of examples 11 to 16, including or excluding optional features. In this example, good feature points are discovered via a corner detection algorithm.

Example 18 includes the method of any one of examples 11 to 17, including or excluding optional features. In this example, the movement of the object is represented by a mean motion vector.

Example 19 includes the method of any one of examples 11 to 18, including or excluding optional features. In this example, the movement of the object includes a distance value of the object.

Example 20 includes the method of any one of examples 11 to 19, including or excluding optional features. In this example, the object is a hand.

Example 21 is an apparatus for a tracker for cursor navigation. The apparatus includes an image capture mechanism to obtain a sequence of frames; an extractor to extract an object mask of an object in the sequence of frames; an optical flow mechanism to track good feature points from the object mask; an estimator to estimate a movement of the object based on the good feature points; and a renderer to render a cursor on the display based on the movement of the object.

Example 22 includes the apparatus of example 21, including or excluding optional features. In this example, the object mask is extracted from the sequence of frames.

Example 23 includes the apparatus of any one of examples 21 to 22, including or excluding optional features. In this example, the good feature points are determined using corner tracking.

Example 24 includes the apparatus of any one of examples 21 to 23, including or excluding optional features. In this example, the good feature points are determined using a Harris corner algorithm.

Example 25 includes the apparatus of any one of examples 21 to 24, including or excluding optional features. In this example, the movement of the object is estimated by obtaining motion vectors for the good feature points across a sequence of frames.

Example 26 includes the apparatus of any one of examples 21 to 25, including or excluding optional features. In this example, the movement of the object is estimated by obtaining motion vectors for the good feature points across a sequence of frames, and the motion vectors with the lowest length are selected and a mean motion vector is determine using the motion vectors with the lowest length.

Example 27 includes the apparatus of any one of examples 21 to 26, including or excluding optional features. In this example, the cursor is to track the movement of the object.

Example 28 includes the apparatus of any one of examples 21 to 27, including or excluding optional features. In this example, the optical flow is performed via a Lucas-Kanade algorithm.

Example 29 is a tangible, non-transitory, computer-readable medium. The computer-readable medium includes instructions that direct the processor to extract an object mask of an object; execute an optical flow on good feature points from the object mask; estimate a movement of the object based on the optical flow; and render a cursor based on the movement of the object.

Example 30 includes the computer-readable medium of example 29, including or excluding optional features. In this example, the computer-readable medium includes instructions that, when executed by a processor, direct the processor to: obtain motion vectors of good feature points in a sequence of frames; select the motion vectors with a lowest length; and average the motion vectors with the lowest length to obtain a mean motion vector.

Example 31 includes the computer-readable medium of any one of examples 29 to 30, including or excluding optional features. In this example, the computer-readable medium includes instructions that, when executed by a processor, direct the processor to: obtain an average motion vector of an object movement; in response to the motion vector being above a threshold, apply the average motion vector to a rendered cursor position; and in response to the motion vector being far from a current cursor position, applying a weighted mean to the average motion vector.

Example 32 includes the computer-readable medium of any one of examples 29 to 31, including or excluding optional features. In this example, the movement of the object is estimated using a motion vector. Optionally, the motion vector is calculated via frame to frame pixel tracking.

Example 33 includes the computer-readable medium of any one of examples 29 to 32, including or excluding optional features. In this example, the movement of the object is estimated using a smallest half of a plurality of motion vectors extracted from the optical flow.

Example 34 includes the computer-readable medium of any one of examples 29 to 33, including or excluding optional features. In this example, the object mask is extracted via a foreground extractor.

Example 35 includes the computer-readable medium of any one of examples 29 to 34, including or excluding optional features. In this example, good feature points are discovered via a corner detection algorithm.

Example 36 includes the computer-readable medium of any one of examples 29 to 35, including or excluding optional features. In this example, the movement of the object is represented by a mean motion vector.

Example 37 includes the computer-readable medium of any one of examples 29 to 36, including or excluding optional features. In this example, the movement of the object includes a distance value of the object.

Example 38 includes the computer-readable medium of any one of examples 29 to 37, including or excluding optional features. In this example, the object is a hand.

Example 39 is an apparatus for a tracker for cursor navigation. The apparatus includes instructions that direct the processor to an image capture mechanism to obtain a sequence of frames; an extractor to extract an object mask of an object in the sequence of frames; a means to track good feature points of the object mask; a means to estimate a movement of the object based on the good feature points; and a renderer to render a cursor on the display based on the movement of the object.

Example 40 includes the apparatus of example 39, including or excluding optional features. In this example, the object mask is extracted from the sequence of frames.

Example 41 includes the apparatus of any one of examples 39 to 40, including or excluding optional features. In this example, the good feature points are determined using corner tracking.

Example 42 includes the apparatus of any one of examples 39 to 41, including or excluding optional features. In this example, the good feature points are determined using a Harris corner algorithm.

Example 43 includes the apparatus of any one of examples 39 to 42, including or excluding optional features. In this example, the movement of the object is estimated by obtaining motion vectors for the good feature points across a sequence of frames.

Example 44 includes the apparatus of any one of examples 39 to 43, including or excluding optional features. In this example, the movement of the object is estimated by obtaining motion vectors for the good feature points across a sequence of frames, and the motion vectors with the lowest length are selected and a mean motion vector is determine using the motion vectors with the lowest length.

Example 45 includes the apparatus of any one of examples 39 to 44, including or excluding optional features. In this example, the cursor is to track the movement of the object.

Example 46 includes the apparatus of any one of examples 39 to 45, including or excluding optional features. In this example, the optical flow is performed via a Lucas-Kanade algorithm.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for a tracker for cursor navigation, comprising:
    a display;
    a camera;
    a memory to store instructions and that is communicatively coupled to the camera and the display; and
    a processor communicatively coupled to the camera, the display, and the memory, wherein when the processor is to execute the instructions to:
        extract an object mask of an object;
        execute an optical flow on good feature points from the object mask;
        estimate a movement of the object based on a plurality of motion vectors extracted from the optical flow;
        select, from the plurality of motion vectors, motion vectors with lengths lower than a threshold;
        average the selected motion vectors to obtain a mean motion vector; and
        render a cursor on the display based on the mean motion vector.

2. The system of claim 1, wherein the object mask is extracted from a sequence of frames obtained from the camera.

3. The system of claim 1, wherein the camera is to capture depth information of the object.

4. The system of claim 1, wherein the good feature points are determined using corner tracking.

5. The system of claim 1, wherein the movement of the object is estimated by obtaining the plurality of motion vectors for the good feature points across a sequence of frames.

6. The system of claim 1, wherein the movement of the object is estimated by obtaining the plurality of motion vectors for the good feature points across a sequence of frames.

7. A method, comprising:
    extracting an object mask of an object;
    executing an optical flow on good feature points from the object mask;
    estimating a movement of the object based on a plurality of motion vectors extracted from the optical flow;
    selecting, from the plurality of motion vectors, motion vectors with lengths lower than a first threshold;
    averaging the selected motion vectors to obtain a mean motion vector; and
    rendering a cursor based on the mean motion vector.

8. The method of claim 7, comprising:
    obtaining the plurality of motion vectors for the good feature points in a sequence of frames.

9. The method of claim 7, comprising
    in response to a distance between a rendered cursor point and a calculated object location being below a second threshold, confirming the calculated object location; and
    in response to the distance between the rendered cursor point and the calculated object location being above the second threshold, applying a weighted mean to the calculated object location and a center of the object.

10. The method of claim 7, wherein the movement of the object is estimated using the plurality of motion vectors for the good feature points.

11. The method of claim 10, wherein the plurality of motion vectors are calculated via frame to frame pixel tracking.

12. The method of claim 7, wherein the selected motion vectors are a smallest half of the plurality of motion vectors extracted from the optical flow.

13. The method of claim 7, wherein the object mask is extracted via a foreground extractor.

14. The method of claim 7, wherein the good feature points are discovered via a corner detection algorithm.

15. The method of claim 7, wherein the movement of the object is represented by the mean motion vector.

16. The method of claim 7, wherein the movement of the object includes a distance value of the object.

17. An apparatus for a tracker for cursor navigation, comprising:
    an image capture mechanism to obtain a sequence of frames;
    an extractor to extract an object mask of an object in the sequence of frames;
    an optical flow mechanism to execute an optical flow on good feature points from the object mask;
    an estimator to estimate a movement of the object based on a plurality of motion vectors extracted from the optical flow;
    a selecting mechanism to select, from the plurality of motion vectors, motion vectors with lengths lower than a threshold;
    an averaging mechanism to average the selected motion vectors to obtain a mean motion vector; and a renderer to render a cursor on a display based on the mean motion vector.

18. The apparatus of claim 17, wherein the object mask is extracted from the sequence of frames.

19. The apparatus of claim 17, wherein the good feature points are determined using corner tracking.

20. The apparatus of claim 17, wherein the good feature points are determined using a Harris corner algorithm.

21. A non-transitory computer-readable medium comprising instructions that, when executed by a processor, direct the processor to:
   extract an object mask of an object;
   execute an optical flow on good feature points from the object mask;
   estimate a movement of the object based on a plurality of motion vectors extracted from the optical flow;
   select, from the plurality of motion vectors, motion vectors with lengths lower than a first threshold;
   average the selected motion vectors to obtain a mean motion vector; and
   render a cursor based on the mean motion vector.

22. The computer readable medium of claim 21, comprising instructions that, when executed by the processor, direct the processor to:
   obtain the plurality of motion vectors for the good feature points in a sequence of frames.

23. The computer readable medium of claim 21, comprising instructions that, when executed by the processor, direct the processor to:
   in response to a distance between rendered cursor point and a calculated object location being below a second threshold, confirm the calculated object location; and
   in response to the distance between the rendered cursor point and the calculated object location being above the second threshold, apply a weighted mean to the calculated object location and a center of the object.

24. The computer readable medium of claim 21, wherein the movement of the object is estimated using the plurality of motion vectors for the good feature points.

25. The computer readable medium of claim 24, wherein the plurality of motion vectors are calculated via frame to frame pixel tracking.

* * * * *